United States Patent [19]

Schulze et al.

[11] 4,115,361

[45] Sep. 19, 1978

[54] POLYETHER UREA EPOXY ADDITIVES

[75] Inventors: Heinz Schulze; Harold G. Waddill, both of Austin, Tex.

[73] Assignee: Texaco Development Corp., New York, N.Y.

[21] Appl. No.: 743,878

[22] Filed: Nov. 22, 1976

[51] Int. Cl.$^2$ ............................................... C08G 59/50
[52] U.S. Cl. .................................... 528/111; 528/94; 528/132; 528/135; 528/93; 260/326.44; 528/117; 528/322; 528/407
[58] Field of Search .......... 260/47 EN, 78.41, 47 EC, 260/326.44

[56] References Cited

U.S. PATENT DOCUMENTS

| 3,462,393 | 8/1969 | Legler | 260/47 |
| 3,496,138 | 2/1970 | Sellers et al. | 260/47 |
| 3,557,056 | 1/1971 | Peerman | 260/47 |
| 3,875,113 | 4/1975 | Lefebvre et al. | 260/47 EN |
| 4,002,598 | 1/1977 | Waddill et al. | 260/47 |

Primary Examiner—Harold D. Anderson
Assistant Examiner—E. A. Nielsen
Attorney, Agent, or Firm—Carl G. Ries; Thomas H. Whaley; Kenneth R. Priem

[57] ABSTRACT

The adhesion properties of amine-cured epoxy resins are unexpectedly enhanced by addition of certain amino terminated polyether succinimide additives. The adhesively superior epoxy resin composition comprises a vicinal polyepoxide, a curing amount of an amine curing agent, and an effective amount of a polyether succinimide having terminal amino groups and a molecular weight of from about 4000 to about 4500.

23 Claims, No Drawings

POLYETHER UREA EPOXY ADDITIVES

BACKGROUND OF THE INVENTION

Field of the Invention

This invention relates to curable epoxy resins having increased adhesive strength; and, more particularly, to amine cured epoxy resins containing certain amino terminated polyether succinimide additives.

Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents is, generally, the amines. The most commonly used amine curing agents are aliphatic amines such as diethylenetriamine, triethylenetetramine and the like and/or polyoxyalkylene polyamines; such as polyoxypropylenediamines and triamines.

Epoxy resin compositions having improved physical properties are obtained by employing polyoxyalkyleneamines, and polyoxyalkylenediamines in particular, as curing agents. It is common to employ with such epoxy resin compositions a co-curing agent such as those described in U.S. Pat. No. 3,549,592.

It has been known to form oligomers from aliphatic or aromatic amines and dibasic acids or anhydrides (U.S. Pat. No. 3,732,189). Further diamines have been reacted with maleimides or anhydrides to give elastomers (U.S. Pat. No. 2,818,405). Also, thermosets have been prepared from epoxides and certain carboxyl terminated nitrogen containing compounds (see U.S. Pat. No. 3,984,373).

It has now been unexpectedly found that specific amine terminated polyoxyalkylene containing succinimide having a molecular weight of from about 4000 to about 4500, when employed as an epoxy additive/curing agent, provide cured epoxy resin compositions exhibiting outstanding strength of adhesion. Specifically, epoxy resins incorporating these additive/curing agents, upon curing, preferably in the presence of an additional amine curing agent, provide a material with high tensile shear strength, high resistance to peel, and superior adhesion to substrates.

The results of incorporating the additives of the instant invention are particularly surprising in light of the fact that similar amine terminated compounds of lower molecular weight do not effect the same improvement in the cured resin. The cured epoxy resin compositions of the instant invention are useful as coatings, castings, sealants and, especially, adhesives.

SUMMARY OF THE INVENTION

According to the broad aspect of the instant invention, the adhesive strength of amine-cured epoxy resins is enhanced by the addition of an effective amount of an amine terminated polyether succinimide having a molecular weight of from 4000 to about 4500.

In one aspect, the terminal amino groups are primary, in another, such groups are secondary.

In accordance with one embodiment, a curable epoxy resin composition having superior adhesive strength comprises a vicinal polyepoxide, and an effective amount of a primary amine terminated polyether succinimide additive/curing agent.

In accordance with a preferred embodiment, a diglycidyl ether of 4,4'-isopropylidene bisphenol, a curing amount of a primary amine-containing curing agent consisting essentially of a polyoxypropylene polyamine having a molecular weight of from about 200 to 500, a piperazine-aminoalkanol accelerator and an effective amount of a primary amine terminated polyether succinimide having a molecular weight of about 4000 are utilized to form a resin.

DETAILED DESCRIPTION OF THE INVENTION

According to the instant inventive concept, blends of a polyepoxide; the amine terminated polyether succinimide compound; preferably, an amine curing agent; and, optionally, an accelerator are thoroughly admixed and cured in accordance with conventional methods to provide cured epoxy resins having unexpectedly superior adhesive strength.

According to one embodiment, a curable epoxy resin contains a diglycidyl ether of 4,4'-isopropylidenebisphenol and an effective amount of a curing agent/additive consisting essentially of a 4000 molecular weight primary amino terminated polyether succinimide. The preferred polyether ureylene is formed by reacting about 2 moles of polyoxypropylenediamine having a molecular weight of about 2,000 with 1 mole of maleic anhydride. According to another embodiment of polyoxypropylenepolyamine having a molecular weight of from about 200 to 500 is used as a (co)-curing agent.

The preferred curable epoxy resin is prepared essentially in three steps. First, the polyether succinimide having terminal primary amino groups is prepared by charging a suitable reaction vessel with approximately 2.0 mols of a polyoxypropylenepolyamine having a molecular weight of about 2000 and consisting substantially of the polyoxypropylenediamine; and about 1.0 mol of maleic anhydride. The mixture is then heated to reflux at temperatures of about 140° to 170° C until azeotropic water removal has ceased. The resultant reaction mixture is then stripped at temperatures of about 170° C to 190° C at pressures of 3 mm Hg to form a viscous liquid. One surprising aspect of the resultant product is the succinimide structure.

In the second step, the viscous liquid obtained in step 1 is admixed with a polyoxypropylenediamine having a molecular weight of from about 200 to 250 in a ratio of from about 5:1 to about 1:5 by weight to produce an admixture. To this admixture can be added a commercial accelerator if desired.

In a third step, the admixture obtained in step 2 is added to a suitable amount of a diglycidyl ether of 4,4'isopropylidene bisphenol such that the total number of equivalent amino groups is about equal to the number of equivalents of epoxide in the epoxy resin composition. The epoxy resin and the curing mixture are thoroughly admixed with the addition of about three drops of a silicone fluid to prevent the formation of voids and bubbles. The resulting formulation, after degassing under vacuum for about 2-5 minutes, is applied to substrates to be bonded and/or cast into molds. The resins are cured at room temperature and preferably post cured at temperatures from about 80° C to 125° C. The cured products exhibit improved tensile shear strength; flexural strength; ultimate elongation; and, especially superior adhesion to substrates.

Generally, the amine cured vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyetheylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins,* McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The amine terminated polyether containing succinimide additive/curing agent can generally be described as polyoxyalkylene containing material having at least one succinimide linkage, terminal amino groups, and a molecular weight of from about 4000 to about 4500. More specifically, these compounds are amino terminated polyoxyalkylene compounds having at least one succinimide linking group and are of the formula:

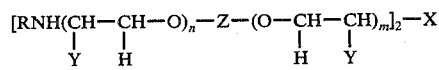

wherein X is a

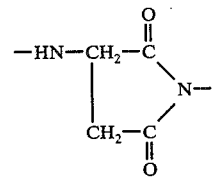

radical; Z is a hydrocarbon alkylene radical having 2 to 5 carbon atoms; Y is hydrogen, a methyl radical or an ethyl radical; and $m$ and $n$ are numbers selected such that the molecule has a molecular weight of from about 4000 to about 4500; R is hydrogen; or, a branched or straight chain alkyl radical of from 1 to about 10 carbon atoms, preferably, from 1 to about 6; or, a monocyclic aryl, alkaryl or aralkyl having from 6 to about 12 carbon atoms preferably, 6 to about 8; or, are branched or straight chain alkenyl or alkadienyl radical of from 2 to about 10 carbon atoms, preferably 3 to about 8; or, an amino alkyl amine radical of the formula:

wherein $p$ is 2 or 3.

The preferred amine terminated succinimides are of the above formula wherein R is hydrogen or a lower alkyl, or more preferably, a lower alkyl of from 1 to 4 carbon atoms; or an amino (1,2 propyl amine) radical; Y is a methyl radical; Z is a 1,2-propylene radical; and $n$ is equal to $m$ which is equal to a number from 16 to 19. preferred lower alkyl groups include methyl, ethyl, n-propyl and n-butyl. In accordance with the most preferred embodiment, R is hydrogen.

The primary amino terminated polyether succinimide compounds are formed by the reaction of maleic anhydride with a polyoxyalkylene diamine having a molecular weight of from about 1800 to about 2200 in two steps. First the reactants are admixed at lower temperature, i.e., room temperature and the crude reaction product is then heated with the removal of water with one mole maleic anhydride at temperatures of from about 120° C to about 180° C.

The diamines that are useful in forming the additives are polyoxyalkylene diamines of the formula:

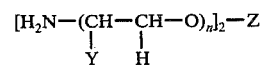

wherein Y is a hydrogen, a methyl radical or an ethyl radical; Z is a hydrocarbon alkylene radical having from 2 to 5 carbon atoms; and, n is an average number from 12 to about 20. Preferred polyoxypropylene diamines are those wherein Y is a methyl radical, n is an average number from 16 to 18, Z is a 1,2-propylene radical. These polyoxyalkylene polyamines can be prepared by known methods as disclosed in U.S. Pat. Nos. 3,236,895 and 3,654,370.

These polyether succinimides are formed by the reaction of a polyoxyalkylenepolyamine as above wherein the alkylene contains from 2 to about 4 carbon atoms, with maleic anhydride.

The reaction proceeds with the liberation of water and one terminal primary amino group of the polyoxyalkylenepolyamine conversion to a succinimide group. The maleic anhydride acts bifunctionally, linking by way of the ethylenic unsaturation to the terminal prior amino group of another polyoxyalkylenediamine.

According to another embodiment, secondary amino terminated polyether succinimide compounds are utilized. Preferably, these compounds are formed by reductive amination of the primary amino terminated compounds prepared as above herein described. The reductive amination of primary amines with aldehydes and ketones over standard hydrogenation/dehydrogenation catalysts is well known and will not, therefore, be further discussed herein. Another well known method for production of the secondary amino containing compound involves the use of an organo halide. This method is not preferred, because of interfering side reactions.

According to a further embodiment, an amino alkyl amine terminated polyether succinimide compound is formed by cyano alkylation of the primary amine terminated polyether succinimide compound above described and subsequent hydrogenation of the cyanoalkylated product. Preparation of the cyanoalkylated adducts is described in U.S. Pat. No. 3,666,788 issued to Rowton, May 30, 1972. The cyanoalkylated products are then hydrogenated in a conventional method, such as over a well known hydrogenation/dehydrogenation catalyst.

It will be realized that, in accordance with the instant invention, the primary amino terminated succinimide can function as the sole amine curing agent. Thus, these compounds function both as an additive to effect adhesion and an amine curing agent.

While it is generally possible to employ the primary amino terminated succinimide compounds as the sole curing agent in the epoxy resin composition, it is preferred to employ these materials in combination with one or more conventional amine curing agents.

The amine curing agents which can be utilized in accordance with the instant invention are generally any of those amine curing agents which are well known to be useful for the curing of vicinal epoxides. Generally, those curing agents having at least three reactive amino hydrogens are useful. Exemplary of those amines which can be utilized are alkylene polyamines such as diethylene triamine, triethylene tetramine and the like; oxyalkylene polyamines such as polyoxypropylene, di- and triamine and diamino derivatives of ethylene glycol, such as 1,13-diamino 4,7,10-trioxatridecane.

Additionally, aromatic amine curing agents are useful, such as the alkylene-linked polyphenyl amines, phenylene diamines and polycyclic or fused aromatic primary amine compounds. Further, the corresponding cycloaliphatic primary amine, i.e., the hydrogenated products of the above aromatic compounds, can be utilized.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

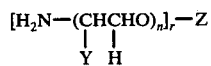

wherein Y is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylene polyamines are the polyoxypropylenediamines wherein Y is a methyl radical, n is a number from 1 to 10, Z is a 1,2-propylene radical and r is about 2. These polyoxyalkylene polyamines can be prepared by known methods as disclosed in U.S. Pat. Nos. 3,236,895 and 3,654,370. The most preferred polyoxyalkylene polyamine is a polyoxypropylene diamine having a molecular weight of about 230.

Another preferred class of polyoxyalkylene polyamines can be depicted by the formula:

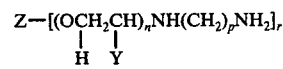

wherein Y, Z, n and r are defined as above and p is 2 or 3. These poly(aminoalkylamino)polyethers are the hydrogenated product of the cyanoalkylated adduct of a polyoxyalkylene polyamine as above described. The preparation of the cyanoalkylated adducts is described in U.S. Pat. No. 3,666,788 issued to Rowton, May 30, 1972. Preferred such compounds are the hydrogenated cyanoethylated polyoxypropylene triamines.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., Handbook of Epoxy Resins, pp. 7-14 describes the use of certain amine-containing compounds as epoxy curing agent-accelerators.

Many accelerators are known in the art which can be utilized in accordance with the instant invention. Examples include salts of phenols; salicyclic acids; amine salts of fatty acids such as those disclosed in U.S. Pat. No. 2,681,901; and, tertiary amines such as those disclosed in U.S. Pat. No. 2,839,480. A preferred accelerator in accordance with the instant invention is disclosed in U.S. Pat. No. 3,875,072 issued to G. Waddill, Apr. 1, 1975. The accelerator comprises a combination of piperazine and an alkanol amine in a weight ratio of about 1:8 to 1:1.

According to the method of the instant invention, the adhesive properties of prior art amine-cured epoxy resins having an epoxy equivalency of greater than about 1.8 are enhanced by the addition of an effective amount of a polyether succinimide having terminal amino groups and a molecular weight of from about 4000 to about 4500 as hereinbefore described. The amount of additive effective in bringing about the increased adhesive property is somewhat empirical and will depend upon the resin, whether an additional amine curing agent is used, and whether an accelerator is used. Generally, the primary amino terminated compound when used as a curing agent/additive can be utilized in approximately stoichiometric amounts.

When utilized with other known amine curing agents, the additives of the instant invention are preferably utilized in amounts from about 5 to about 40 parts by weight based on 100 parts by weight of the resin.

Whether used alone or with an amine curing agent, the exact amount of additive material needed to increase adhesion can readily be determined without undue experimentation owing to the fact that a resin mixture containing an effective amount of the additive will undergo changes which are readily visible as curing proceeds. Specifically, the curing resin takes on an opaque, milky white appearance that becomes more pronounced during curing and results in a product which has a lustrous white appearance. It will be realized that, advantageously, this optical absorption shift enhances the beauty of cast objects and negates the need to use white pigments or fillers.

The ratio of the succinimide compound and the curing agent to resin can be easily determined on an equivalence basis. This equivalence determination should also include the functional groups of the accelerator, if one is used. The amount is calculated by adding together the number of equivalents, on the basis of weight per replaceable N-H group, in the sum of the amine curing agent, the amine terminated additive and the accelerator, if one is used. Preferably, based on the above calculations, wherein an admixture of a polyoxyalkylenediamine curing agent, the primary amine containing additive and the preferred accelerator are utilized, the admixture is used, in amounts which provide up to about a 10% excess of the stoichiometric amount required based on the resin.

According to a preferred embodiment, the adhesive properties of prior art resin formulations having an epoxy equivalency greater than 1.8 are enhanced by addition of an effective amount of the primary amine terminated polyoxypropylene succinimide additive based upon the condensation of 1 mole maleic anhydride with 2 moles of a polyoxypropylenediamine having a molecular weight of 2000. Preferred prior are resin formulations comprise polyglycidyl ethers of polyhydric phenols, cured by incorporating therein a curing amount of a polyoxyalkylenepolyamine of molecular weight from about 200 to 500 and an accelerator combination of piperazine and an alkanolamine, in a weight ratio of between about 1:8 to 1:1. Exemplary preferred prior art compositions can be enhanced in accordance with the instant invention are disclosed in U.S. Pat. No. 3,943,104 issued Mar. 9, 1976 to G. Waddill.

The curable epoxy resin compositions of the instant invention generally comprise a vicinal polyepoxide, having an epoxy equivalency greater than 1.8, a curing amount of an amine curing agent, and effective amount of the amine terminated polyether succinimide additive; and, optionally, an accelerator.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and more preferably 100% by weight has been shown to greatly enhance the desirable properties of the cured material, especially the adhesive strength.

Likewise, although all of the disclosed amine curing agents are generally useful to cure the resin, it has been found that those resins containing curing agents, (other than the succinimide containing additive) wherein the amino moieties are separated by large aliphatic or oxyalkylene chains, are viscous and rather difficult to work with. For example, resins cured with a polyoxypropylenediamine having molecular weights much in excess of about 400, are not practically utilized to enhance adhesive strengths in the presence of otherwise effective amounts of the additives. As a matter of handling and convenience, those amines below about 500 m.w. are preferred. The more preferred amine curing agents are those polyamines having an amine equivalent weight of from 20 to about 150 with 40 to 70 being more preferred. Examples of such agents include polyoxypropylenediamines having a molecular weight in the range of 200 to 500 and polyoxypropylenepolyamines having a molecular weight of from about 400 to 700.

It will be realized that any amine curing agent which is less effective in providing the adhesively superior resins can readily be avoided by the skilled artisan without undue experimentation, since such agents do not effectuate the "optical shift."

The amine cured resins having superior adhesion in accordance with the instant invention are prepared in a conventional manner. When an amine curing agent is employed in addition to the additive, the admixture is combined with the polyepoxide composition in amounts according to the amine equivalent weight of the admixture. Generally the number of equivalents of amine groups is from about 0.8 to about 1.2 times the number of epoxide equivalents present in the curable epoxy resin composition, with a stoichiometric amount being preferred. When using an accelerator, amounts from 1 to about 10 parts by weight based on 100 parts by weight of the resin are generally satisfactory. The exact amount of constituents in accordance with the above general requirements will depend primarily on the application for which the cured resin is intended.

When the polyether succinimide is used alone, it is incorporated into the uncured resin by admixing. When an additional curing agent is used, preferably, the polyether succinimide is first admixed with the curing agent and/or the accelerator prior to addition to the resin. The constituents forming the curable material are then intimately admixed by standard methods and degassed in the presence of a commercial defoamer and minute amounts of silicone oils to prevent voids and bubbles.

When an accelerator is used, a preferred accelerator comprises from about 1 to about 5 parts by weight, per one hundred parts by weight of the resin, of a piperazine/alkanolamine admixture in a weight ratio of between about 1:8 and about 1:1 piperazine to alkanolamine. The above amount of accelerator is admixed with a polyoxyalkylenediamine curing agent in amounts of from about 10 to 50 parts by weight accelerator to 100 parts by weight of the curing agent.

As mentioned hereinbefore, while it is satisfactory to employ the polyether succinimide material as the sole curing agent in the epoxy resin composition, it is preferred that it be employed in combination with an amine curing agent conventionally employed in curing epoxy resin compositions, as previously herein enumerated. Polyoxyalkylenediamines of the type hereinbefore described and having an amine equivalence of from 40 to 70 are preferable (co)-curing agents. It has been found that ratios of polyether succinimide to amine (co)-curing agent of from about 5:1 to about 1:5 produce cured epoxy resin compositions with significantly improved properties, for example, tensile shear strength, flexural strength, ultimate elongation and, most significantly, adhesion.

Generally, the mixture of epoxy resin, polyoxyalkylenepropylene polyamine, the polyether succinimide additive and the accelerator combination of piperazine and alkanolamine is allowed to self-cure at ambient temperatures of between 0° to about 45° C. It has been found expeditious that the mixture be post-cured at elevated temperatures of up to about 135° C.

In accordance with a preferred embodiment, a curable resin comprises a diglycidyl ether of 4,4'-isopropylidene bisphenol; a curing amount of a primary amine-containing curing agent consisting essentially of a polyoxypropylene diamine having a molecular weight of from about 200 to 250; an accelerator of piperazine and an triethanolamine in a weight ratio of 3 to 7; and, an effective amount of a polyether succinimide having terminal primary amino groups and a molecular weight of about 4000.

According to a greatly preferred embodiment, resins of the polyglycidyl ether of polyhydric phenol type are cured by incorporating therein up to about a stoichiometric amount of a polyoxyalkylenepolyamine having a molecular weight of about 230; from about 5 to 30 parts by weight of the primary amine terminated polyether succinimide having a molecular weight of about 4000; and from 1 to 5 weight percent based on 100 parts by weight of the resin of an accelerator comprising a 3:7 weight percent admixture of piperazine:triethanolamine. The composition is cured at room temperature (about 25° C) to produce products having superior adhesive strength in accordance with the instant invention.

It will further be realized that various conveniently employed additives can be admixed with the polyepoxide containing composition of the instant invention prior to final cure. For example, in certain instances it may be desired to add minor amounts of other polyalkyleneamine co-catalysts as herein described, or hardeners along with various other accelerators and curing agent systems well known in the art.

Additionally, conventional pigments; dyes; fillers; flame retarding agents and the like which are compatible; natural or synthetic resins can be added. Furthermore, although not preferred, known solvents for polyepoxide materials such as toluene, benzene, xylene, dioxane, ethylene glycol monomethylether and the like can be used. The polyepoxide resins containing the additives of the instant invention can be used in any of the above applications for which polyepoxides are customarily used. One outstanding feature of the instant composition resides in the fact that they are opaque upon curing and give a smooth, white lustrous surface which may be of particular benefit for certain molding and casting operations. The compositions of the instant invention can be used as impregnants, surface coatings, pottings, capsulating compositions, laminants, and, particularly and most importantly, as adhesives for bonding metallic elements or structures permanently together.

The following exaples illustrate the nature of the instant invention but are not intended to be limitative thereof. (4)examples

EXAMPLE I

In this example an amino terminated polyether succinimide additive for use in accordance with the instant invention, was prepared. Into a suitable, clean, dry, reaction vessel, equipped with thermometer, stirring apparatus, reflux apparatus, and Dean-Stark trap were added 750 grams (0.39 mol) of a polyoxypropylenepolyamine having a molecular weight of approximately 2000, and an analysis of about 1.01 milliequivalents (meq.) primary amine/g sold under the tradename "JEFFAMINE® D-2000" by Jefferson Chemical Co., Austin, Texas 78751 and 18.4 g. (.183 mol) maleic anhydride and 50 grams of benzene. This admixture was heated at reflux (pot temperature 146°-167° C) for about 2¼ hours until azeotropic water removal (2.3 g. $H_2O$) had ceased. Benzene was then removed from the crude reaction mixture until a pot temperature of 205° C was attained. The remaining reaction product was then stripped at 180° C/3 mm Hg to produce a viscous residue which, upon analysis, showed 0.64 meq. total amine/g., 0.43 meq. primary amine/g., 0.009 meq. acidity/g. IR analysis indicated the presence of the succinimide group.

To illustrate the advantage of the amino terminated polyether succinimide additives of this invention, various epoxy formulations employing diglycidyl ether of 4,4'-isopropylidene bisphenol were cured with various known polyamine curing agents. Where indicated, a commercial accelerator was utilized. Three drops of silicone fluid were added to each formulation to prevent formation of voids and bubbles. After degassing under vacuum, the formulations were cured under the conditions indicated. In appropriate examples, the cured products were subjected to standard American Society for Testing Materials (ASTM) tests for peel strength (ASTM D-903) and tensile shear strength (ASTM D-1002-64. The test results were measured on adhesive bond with substrates. All substrates were aluminum panels (No. 2024-%-3 alloy, 16 gage), degreased, then chromic acid etched prior to bonding. The abbreviations in the tables, pbw and psi stand for parts by weight, and pounds per square inch, respectively.

EXAMPLES II-V

In these examples epoxy resins were prepared wherein diglycidyl ether of 4,4'-isopropylidene bisphenol was cured with a polyoxypropylenediamine curing agent of m.w. 230 having an equivalent weight of 58 to which were added the indicated amounts of the amino terminated polyether succinimide prepaed in Example I. The resulting resins were used to bond aluminum to aluminum and the resultant subjected to the ASTM tests herein described. The data, which is for comparative purposes only, is presented in the following Table I.

TABLE I

| Formulations | Examples | | | |
|---|---|---|---|---|
| | 2 | 3 | 4 | 5 |
| Epoxide, pbw (Eq. 190) | 100 | 100 | 100 | 100 |
| Curing agent, pbw[1] | 30 | 30 | 30 | 30 |
| Accelerator, pbw[2] | 10 | 10 | 10 | 10 |
| Polyether Succinimide[3] | 0 | 75 | 14 | 29 |
| Properties[4] | | | | |
| Tensile shear strength, psi | 1250 | 3860 | 4110 | 3310 |
| Peel strength, pli | 7.6 | 10.1 | 23.2 | 38.4 |

[1]Sold by Jefferson Chemical Company, Austin, Texas 78751 under the the name "JEFFAMINE ® D-230"
[2]A piperazine-triethanolamine admixture (30:70) sold by Jefferson Chemical Company, Austin, Texas 78751 under the name Accelerator "398"
[3]The product of Example I
[4]Cure conditions: room temperature, 7 days This example demonstrates the improved adhesion strength of the epoxy formulation when amounts of the polyether succinimide are added to an epoxy formulation cured with a polyoxypropylenediamine of m.w. 230.

EXAMPLE VI

This example further shows the use of the additive in accordance with the instant invention with a different amine curing agent. Using the compound prepared in Example I as the additive, a cured formulation was prepared as shown in Table II.

TABLE II

| Formulation | Example 6 |
|---|---|
| Epoxy resin (Eq 190) | 100 |
| Curing agent, pbw[1] | 57 |
| Additive, pbw[2] | 24 |
| Accelerator[3] | 10 |
| Appearance of casting after cure: | |
| 24 hrs., room temperature | Opaque, white |
| 3 hrs., 125° C | Opaque, white |

[1]Sold by Jefferson Chemical Company, Austin, Texas 78751 under the name "JEFFAMINE ® D-400"
[2]The product of Example I
[3]A piperazine-triethanolamine admixture (30:70) sold by Jefferson Chemical Company, Austin, Texas 78751 under the name "Accelertor 398"

The opaque appearance of the casting after cure indicates the presence of the improved adhesive properties.

While the invention has been explained in relation to its preferred embodiment, it is to be understood that various modifications thereof will become apparent to those skilled in the art upon reacing the specification and is intended to cover such modifications as fall within the scope of the appended claims.

What is claimed is:

1. An epoxy resin composition having superior adhesion properties and being the cured product of a curable admixture which comprises;
    a vicinal polyepoxide having an epoxide equivalency of greater than 1.8;
    a curing amount of a polyamine curing agent having at least 3 reactive amino hydrogens; and,
    an effective amount of an additive consisting essentially of a polyether succinimide of the formula:

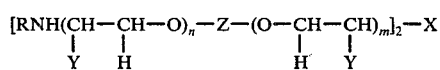

wherein X is a

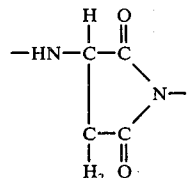

radical; Z is a hydrocarbon alkylene radical having 2 to 5 carbon atoms; Y is hydrogen, a methyl radical or an ethyl radical; and $m$ and $n$ are numbers selected such that the molecule has a molecular weight of from about 4000 to about 4500; R is hydrogen, or, a branched or straight chain alkyl radical of from 1 to about 10 carbon atoms; or, a monocyclic aryl, alkaryl or aralkyl radical having from 6 to about 12 carbon atoms; or, are branched or straight chain alkenyl or alkadienyl radical of from 2 to about 10 carbon atoms; or, an amino alkyl amine radical of the formula:

$$-NH(CH_2)_pNH_2$$

wherein $p$ is 2 or 3.

2. The composition of claim 1 wherein R is hydrogen or a lower alkyl of from 1 to 4 carbon atoms; or an amino (1,2 propyl amine) radical; Y is a methyl radical; Z is a 1,2-propylene radical; and $n$ is equal to $m$ which is equal to an average number of from 16 to 19.

3. The composition of claim 1 wherein R is hydrogen.

4. The composition of claim 2 wherein R is a lower alkyl radical selected from the group consisting of methyl, ethyl, n-propyl and n-butyl.

5. The composition of claim 1 further comprising an effective amount of a composition effective in accelerating the cure.

6. The composition of claim 5 wherein said vicinal polyepoxide is more than 80% by weight of a polyglycidyl ether of polyhydric phenols, wherein said polyamine curing agent is a polyoxyalkylene polyamine having an amine equivalent of sufficient value to effect an optical shift such that the cured material takes on an opaque, white luster, and werein said composition effective in accelerating the cure comprises a combination of piperazine and an alkanol amine in a weight ratio of about 1:8 to 1:1.

7. The composition of claim 6 wherein said vicinal polyepoxide is a polyglycidyl ether of a polyhydric phenol; wherein said polyamine curing agent is a polyoxyalkylene polyamine having an amine equivalent weight of from 20 to about 70.

8. The composition of claim 7 werein said curing agent is selected from polyoxyalkylene polyamines of the formula:

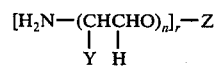

wherein Y is hydrogen, a methyl radical or an ethyl radical; Z is a hydrocarbon radical having 2 to 5 carbon atoms forming from 2 to 4 external ether linkages; $n$ is a number from 1 to about 15 and $r$ is a number from 2 to 4; or, the formula:

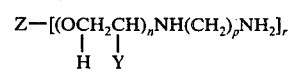

wherein Y, Z, n and r are defined as above and p is 2 or 3.

9. A method for increasing the adhesive strength of an epoxy resin composition, being the cured product of a curable admixture comprising a vicinal polyepoxide having an epoxide equivalency of greater than 1.8; and, a curing amount of a polyamine curing agent having at least 3 reactive amino hydrogens comprising the step of:
adding to said curable admixture an effective amount of a polyether succinimide additive of the formula:

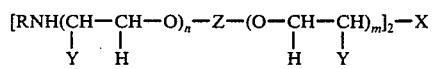

wherein X is a

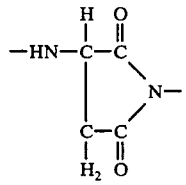

radical; Z is a hydrocarbon alkylene radical having 2 to 5 carbon atoms; Y is a hydrogen, a methyl radical or an ethyl radical; and m and n are numbers selected such that the molecule has a molecular weight of from about 4000 to about 4500; R is hydrogen; or, a branched or straight chain alkyl radical of from 1 to about 10 carbon atoms; or, a monocyclic aryl, alkaryl or aralkyl radical having from 6 to about 12 carbon atoms; or, are branched or straight chain alkenyl or alkadienyl radical of from 2 to about 10 carbon atoms; or, an amino alkyl amine radical of the formula:

wherein p is 2 or 3.

10. The method of claim 9 wherein R is hydrogen or a lower alkyl; or an amino (1, 2 propyl amine) radical; Y is a methyl radical; Z is a 1,2-propylene radical; and n is equal to m which is equal to an average number of from 16 to 19.

11. The method of claim 10 wherein R is hydrogen.

12. The method of claim 10 wherein R is a lower alkyl radical selected from the group consisting of methyl, ethyl, n-propyl and n-butyl.

13. The method of claim 12 wherein said curable admixture further comprises an effective amount of a composition effective in accelerating the cure.

14. The method of claim 13 wherein said vicinal polyepoxide is more than 80% by weight of a polyglycidyl ether of polyhydric phenols, wherein said polyamine curing agent is a polyoxyalkylene polyamine having an amine equivalent of sufficient value to effect an optical shift such that the cured material takes on an opaque, white luster; and wherein said composition effective in accelerating the cure comprises a combination of piperazine and an alkanol amine in a weight ratio of about 1:8 to 1:1.

15. The method of claim 14 wherein said vicinal polyepoxide is a polyglycidyl ether of a polyhydric phenol; wherein said polyamine curing agent is a polyoxyalkylene polyamine having an amine equivalent weight of from 20 to about 70.

16. The method of claim 15 wherein said curing agent is selected from polyoxyalkylene polyamines of the formula:

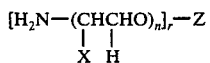

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4; or, the formula:

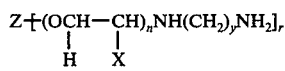

wherein X, Z, n and r are defined as above and y is 2 or 3.

17. A curable resin composition comprising a diglycidyl ether of 4,4'-isopropylidene bisphenol polyepoxide; a curing amount of a primary amine-containing curing agent consisting essentially of a polyoxypropylene diamine having a molecular weight of from about 200 to 250, an accelerator of piperazine and a triethanolamine in a weight ratio of 3 to 7; and, an effective amount of a polyether succinimide additive of the formula:

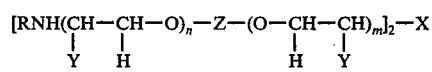

wherein X is a

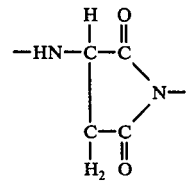

radical; Z is a hydrocarbon alkylene radical having 2 to 5 carbon atoms; Y is a hydrogen, a methyl radical or an ethyl radical; and m and n are numbers selected such that the molecule has a molecular weight of from about 4000 to about 4500; R is hydrogen; or, a branched or straight chain alkyl radical of from 1 to about 10 carbon atoms; or, a monocyclic aryl, alkaryl or aralkyl having from 6 to about 12 carbon atoms, or, are branched or straight chain alkenyl or alkadienyl radical of from 2 to about 10 carbon atoms; or, an amino alkyl amine radical of the formula:

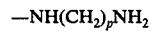

wherein p is 2 or 3.

18. The resin of claim 17 wherein said primary amine-containing curing agent is present in about a stoichiometric amount; said accelerator is preset in amount from about 1 to 5 parts by weight based on 100 parts by weight said polyepoxide, said additve is present in amount from about 5 to 40 parts by weight based on 100 parts by weight of said polyepoxide.

19. An epoxy resin composition having superior adhesion properties and being the cured product of a curable admixture which comprises:

a vicinal polyepoxide having an epoxide equivalency of greater than 1.8;

an effective amount of a curing agent consisting essentially of a polyether succinimide of the formula:

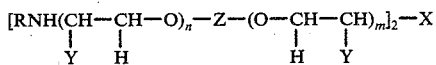

wherein X is a

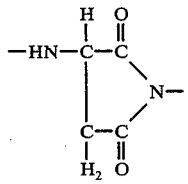

radical; Z is a hydrocarbon alkylene radical having 2 to 5 carbon atoms; Y is hydrogen, a methyl radical or an ethyl radical; and $m$ and $n$ are numbers seleceted such that the molecule has a molecular weight of from about 4000 to about 4500; R is hydrogen; or, a branched or straight chain alkyl radical of from 1 to about 10 carbon atoms; or, a monocyclic aryl, alkaryl or aralkyl having from 6 to about 12 carbon atoms or, are branched or straight chain alkenyl or alkadienyl radical of from 2 to about 10 carbon atoms; or, an amino alkyl amine radical of the formula:

wherein $p$ is 2 or 3.

20. The composition of claim 19 wherein R is hydrogen or a lower alkyl; or an amino (1,2 propyl amine) radical; Y is a methyl radical; Z is a 1,2-propylene radical; and $n$ is equal to $m$ which is equal to an average number of from 16 to 19.

21. The composition of claim 20 wherein R is hydrogen.

22. The composition of claim 21 wherein R is a lower alkyl radical selected from the group consisting of methyl, ethyl, n-propyl and n-butyl.

23. The composition of claim 19 further comprising an effective amount of a composition effective in accelerating the cure.

* * * * *